US011329468B2

(12) United States Patent
Elford et al.

(10) Patent No.: US 11,329,468 B2
(45) Date of Patent: May 10, 2022

(54) SYSTEM AND METHOD FOR NEW CABLE PROVISIONING UTILIZING BURIED CABLE

(71) Applicant: CenturyLink Intellectual Property LLC, Broomfield, CO (US)

(72) Inventors: Michael L. Elford, Calhoun, LA (US); Pete A. Kawamoto, Littleton, CO (US); Diana L. Unser, Lakewood, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 16/595,146

(22) Filed: Oct. 7, 2019

(65) Prior Publication Data
US 2020/0036177 A1 Jan. 30, 2020

Related U.S. Application Data

(63) Continuation of application No. 15/669,525, filed on Aug. 4, 2017, now Pat. No. 10,439,382.

(60) Provisional application No. 62/410,691, filed on Oct. 20, 2016, provisional application No. 62/371,647, filed on Aug. 5, 2016.

(51) Int. Cl.
*E21B 7/30* (2006.01)
*H02G 9/02* (2006.01)
*E21B 7/24* (2006.01)
*E21B 47/09* (2012.01)
*H02G 1/06* (2006.01)

(52) U.S. Cl.
CPC ............... *H02G 9/02* (2013.01); *E21B 7/24* (2013.01); *E21B 7/30* (2013.01); *E21B 47/09* (2013.01); *H02G 1/06* (2013.01)

(58) Field of Classification Search
CPC ..... E21B 7/30; E21B 7/28; E21B 47/09; E21B 7/24; H02G 1/06; H02G 9/02; F16L 55/168
See application file for complete search history.

(56) References Cited

U.S. PATENT DOCUMENTS

| 2,827,264 | A |   | 3/1958  | Sitton |
|-----------|---|---|---------|--------|
| 4,403,667 | A |   | 9/1983  | Reichman |
| 4,519,462 | A |   | 5/1985  | Kelley |
| 5,096,000 | A | * | 3/1992  | Hesse ............ E21B 4/145 |
|           |   |   |         | 175/171 |
| 5,639,183 | A |   | 6/1997  | Griffioen |
| 6,824,329 | B2 |  | 11/2004 | van Bijsterveld |
| 7,814,654 | B2 |  | 10/2010 | Pichler |
| 7,967,530 | B2 |  | 6/2011  | Mayhew |

(Continued)

FOREIGN PATENT DOCUMENTS

DE      10-2011-087642      6/2013

*Primary Examiner* — Carib A Oquendo

(57) ABSTRACT

Novel tools and techniques for underground cable installation are provided. A system includes a compressor and a boring attachment. The boring attachment may be operatively coupled to the compressor and further coupled to an outer sheath of a buried cable. The boring attachment may be configured to be actuated by the compressor. In response to being actuated by the compressor, the boring attachment may be configured to displace at least some ground material, in contact with the buried cable, in which the buried cable is buried, and advance in at least one direction along a longitudinal axis of the buried cable.

20 Claims, 7 Drawing Sheets

(56) References Cited

U.S. PATENT DOCUMENTS

| | | |
|---|---|---|
| 9,651,167 B2 | 5/2017 | Harr |
| 2003/0012606 A1 | 1/2003 | van Bijsterveld |
| 2004/0067108 A1 | 4/2004 | Bayer |
| 2007/0119283 A1 | 5/2007 | Wurm |
| 2016/0372902 A1 | 12/2016 | Nusbaum |
| 2017/0085065 A1 | 3/2017 | Fitzgerald |
| 2018/0039040 A1 | 2/2018 | Elford et al. |
| 2018/0041017 A1 | 2/2018 | Elford et al. |
| 2018/0115141 A1 | 4/2018 | Elford et al. |

* cited by examiner

SYSTEM AND METHOD FOR NEW CABLE PROVISIONING UTILIZING BURIED CABLE

CROSS REFERENCE TO RELATED APPLICATIONS

This application is a continuation application of U.S. patent application Ser. No. 15/669,525, filed Aug. 4, 2017 by Michael L. Elford et al., entitled, "System and Method for New Cable Provisioning Utilizing Buried Cable;" which claims priority to U.S. Provisional Patent Application Ser. No. 62/371,647, filed Aug. 5, 2016 by Michael L. Elford et al., entitled, "DCBP—Direct Cable Buried Project to Place Fiber;" and U.S. Provisional Patent Application Ser. No. 62/410,691 filed Oct. 20, 2016 by Michael Elford et al., entitled "DCBP—Direct Cable Buried Project (Boring Process)."

This application may be related to U.S. Provisional Patent Application Ser. No. 62/371,646, filed Aug. 5, 2016 by Michael L. Elford et al., entitled, "DCEP—Direct Cable Expansion Project to Insert Fiber;" U.S. Provisional Patent Application Ser. No. 62/410,688, filed Oct. 20, 2016 by Michael L. Elford et al., entitled "DCEP—Direct Cable Expansion Project (Injection Process);" and U.S. Provisional Patent Application Ser. No. 62/410,696 filed Oct. 20, 2016 by Michael Elford et al., entitled "DCAPP—Direct Cable Applied Physical Process."

The respective disclosures of these applications/patents (which this document refers to collectively as the "Related Applications") are incorporated herein by reference in their entirety for all purposes

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to telecommunication cables and physical transmission mediums, and more particularly to tools and techniques for the installation of telecommunication cables in relation to existing cables.

BACKGROUND

Copper wire cabling has historically been used as a transmission medium for telecommunications. Copper cables, such as twisted pair cabling, traditionally used in telecommunications offer limited data bandwidth, and are also limited by the distances over which signals need to be carried in modern telecommunications. As demand for bandwidth and transmission speed increases, the use of existing copper cables has been replaced by other transmission media, such as optical fiber.

Typically, telecommunication lines are buried. Thus, to install new cable or replace existing copper cable, cost and labor-intensive processes are used. This may involve excavation and trenching of roads, residential areas, and other areas where the cable will be buried.

Accordingly, tools and techniques for the underground installation of new cables are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
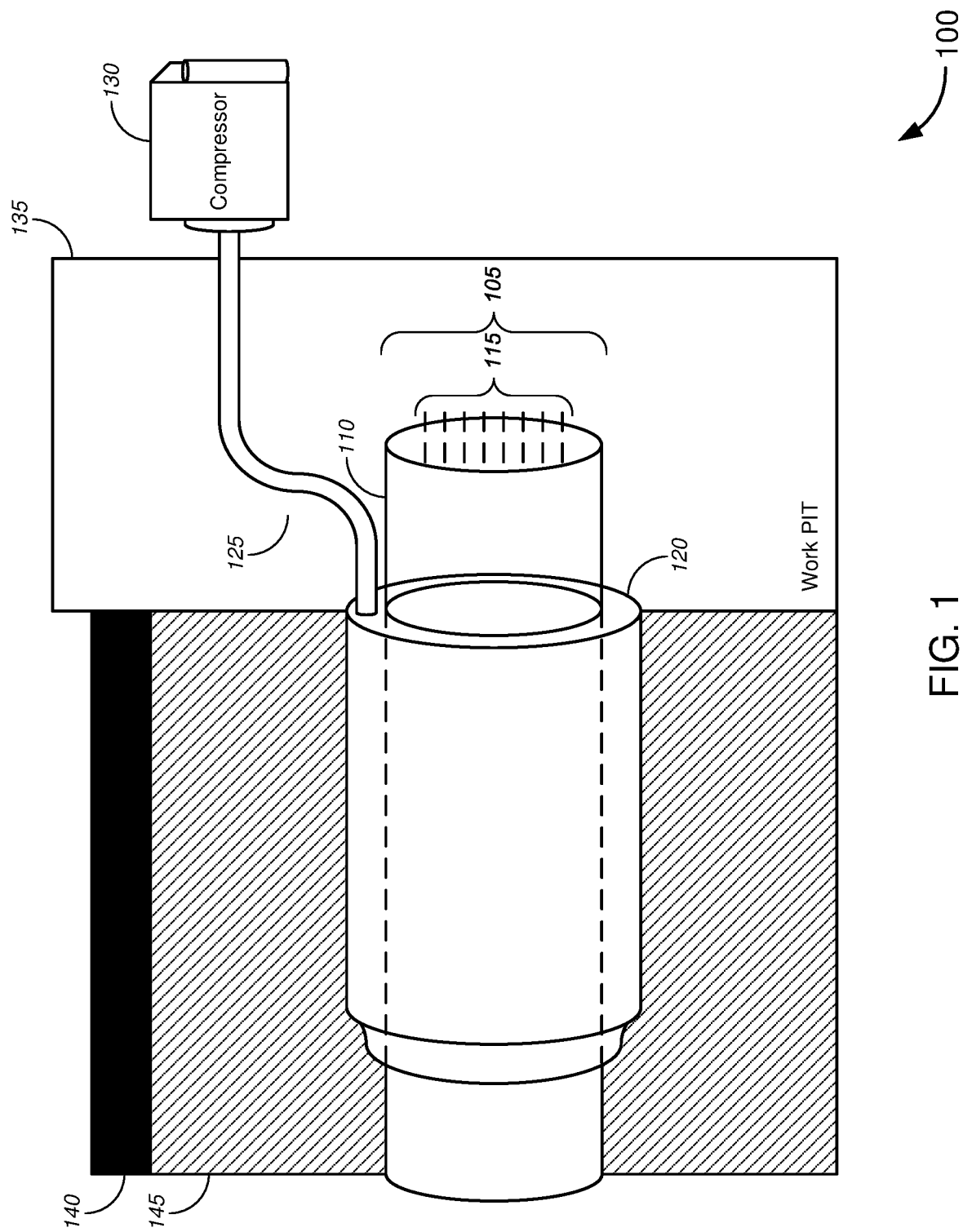
FIG. 1 is a schematic illustration of a system for underground cable installation, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a system is provided for the underground installation of a new cable. The system may include a compressor and boring attachment. The boring attachment may be configured to be operatively coupled to an existing buried cable. The buried cable may be buried, underground, in a ground material. The boring attachment may be driven or otherwise actuated by the compressor to displace a ground material around an existing cable. For example, this may be accomplished, without limitation, by vibrating, rotating, pistoning, hammering, drilling, grinding, boring, moling, or any combination of these actions. The boring attachment may further be configured to advance longitudinally along the existing buried cable. In some examples, the boring attachment may further be configured to place a new cable in a desired position, via any of pulling, pushing, laying, or feeding the new cable into the desired position.

In some examples, an apparatus is provided for the underground installation of a new cable. The apparatus may include a boring attachment operatively coupled to a compressor. The boring attachment may be configured to be coupled to an outer sheath of a buried cable and be driven, or otherwise actuated, by the compressor. In response to being driven by the compressor, the boring attachment may be configured to displace ground material in contact with the buried cable, and to advance along the length of the buried cable. The boring attachment may further be configured to place a new cable in a desired position adjacent to existing buried cable.

In another aspect, a method for the underground installation of a new cable is provided. The method includes attaching a boring attachment to an outer sheath of a buried cable. The boring attachment may then be driven or otherwise actuated via a compressor. In response to being driven by compressor, the boring attachment may displace at least some ground material, in contact with the buried cable, in which the buried cable is buried. The boring attachment may advance in at least one direction coextensive with a longitudinal axis of the buried cable.

FIG. 1 is a schematic illustration of a system 100 for underground cable installation. According to various embodiments, the system 100 includes a cable 105 with an outer sheath 110 and core 115, a boring attachment 120, hose 125, and compressor 130. FIG. 1 also depicts a work pit 135, top surface 140, and ground material 145. It should be noted that the components of the system 100 are schematically illustrated in FIG. 1, and that a variety of hardware configurations are possible in accordance with various embodiments.

In various embodiments, the boring attachment 120 may be coupled to the exterior of the cable 105 around the outer sheath 110. The boring attachment 120 may be configured move in at least one direction along a longitudinal axis of the cable 105. The boring attachment 120 may further be coupled to a compressor 130 via hose 125. The cable 105 may be a buried cable, surrounded on either side by ground material 145. A work pit 135 may be created to allow access to at least part of the cable 105 from the top surface 140, to allow the boring attachment 120 to be coupled to the cable 105.

In various embodiments, cable 105 may include an outer sheath 110 and core 115. The cable 105 may include any type of cable, buried or otherwise, such as those used for electrical transmission and telecommunications. Types of cable may include, without limitation, copper cables, telephone cables, twisted pair cables, and optical fiber cables, among others. In some further embodiments, the cable 105 may further include a housing configured to carry one or more sub-cables. For example, housings may include, without limitation, ducts (e.g., inner ducts), and cable conduits.

The outer sheath 110 of the cable 105 may act to hold together (e.g., house) one or more wires, conductors, optical fibers, or other transmission lines of the core 115. The outer sheath 110 may further serve as a protective cover to physically protect the cable from damage and wear due to movement, vibration, weather, moisture, and the ground material 145 surrounding the cable 105. Ground material 145 may include soil, silt, dust, sand, clay, gravel, rock, and water. Accordingly, the outer sheath 110 may include, without limitation, tubes, sleeves, shielding, and jackets surrounding the one or more wires, conductors, optical fibers, or other transmission lines of the core 115.

The core 115 may include one or more types of transmission media located inside or otherwise housed by the outer sheath 110. In some embodiments, the core 115 may be a single conductor, wire, optical fiber, or other transmission line. For example, the core 115 may be a single copper conductor core. In other embodiments, the core 115 may include multiple conductors, wires, optical fibers, cables, and/or other transmission lines of the same type, such as, for example multiple copper wire twisted pair cables. Alternatively, the core 115 may include multiple transmission lines of different types. For example, the core 115 may include one or more copper wire twisted pair cables, and one or more copper wires for power delivery. Accordingly, the core 115 may include one or more transmission lines of one or more transmission media types. In various embodiments, the cable 105 and/or core 115 may further include, in addition to the transmission lines, any associated insulation, shielding, cladding, buffering, or other inner material located adjacent to the interior of the outer sheath 110.

Accordingly, the outer sheath 110 may be configured to provide protection to the core 115 against physical stresses and the environment around the cable 105. Suitable materials for the outer sheath 110 may include, without limitation, rubber, thermoplastics such as polyvinyl chloride (PVC), polyurethane (PU), acrylonitrile butadiene styrene (ABS), polycarbonate (PC), polyethylene (PE), polypropylene (PP), and other plastics.

In various embodiments, the boring attachment 120 may be configured to displace the ground material 145 around the outer sheath 110. Displacement of the ground material 145 may include, without limitation, loosening, removing, or otherwise moving the ground material 145. For example, in some embodiments, the ground material 145 may be compacted (e.g., compacted soil). Thus, the boring attachment 120 may be configured to loosen the compacted ground material 145. In other embodiments, the boring attachment 120 may be configured to move the ground material 145 away from the outer sheath 110. In various embodiments, the boring attachment may be configured to accomplish through mechanical action or hydraulically. For example, mechanical action may include, without limitation, vibrating, rotating, pistoning, hammering, drilling, grinding, boring, moling, or a combination of such actions. Hydraulic action may include the introduction of water to wash away the surrounding ground material 145. In some embodiments, water or another fluid may be used in combination with the mechanical action of the boring attachment 120. Thus, the boring attachment 120 may be configured to move longitudinally along the outer sheath 110, displacing surrounding ground material 145 along the length of the cable 105. In various embodiments, the amount of ground material 145 displaced, or alternatively, the amount by which the ground material 145 is displaced, by the boring attachment 120 may be adjusted. In some embodiments, ground material 145 may be determined by, without limitation, the amplitude, speed, or frequency of the mechanical action of the attachment. For example, rotation rate, vibration speed, vibration intensity (e.g., amplitude), direction of vibration, may each be adjusted according to desired displacement characteristics.

In some embodiments, the boring attachment 120 may further be configured to create a channel around at least part of the cable 105, pushing the ground material 145 away from the outer sheath 110. The channel may include a volume that coextends with the outer sheath 110. The channel may be formed to create spacing between the outer sheath 110 and the ground material 145. In some embodiments, the channel may be formed such that separation between the outer sheath 110 and ground material 145 occurs over at least part of the outer sheath 110 circumferentially. In further embodiments, the channel may be formed over the entire circumference of the outer sheath 110, surrounding the outer sheath 110 on all sides.

Accordingly, in various embodiments, the ground material 145 may be displaced utilizing the boring attachment 120 and compressor 130. The boring attachment 120 may be coupled to the compressor 130 via the hose 125. The boring attachment 120 may be configured to be actuated by the compressor 130. In various embodiments, actuation may include, without limitation, pneumatic, hydraulic, or electrical actuation. When positioned over the outer sheath 110, the boring attachment 120 may be actuated to displace the ground material 145. In some embodiments, the boring attachment 120 may displace the ground material 145 by mechanical action, or alternatively, by hydraulic boring.

In some embodiments, the boring attachment 120 may further be configured to advance in one or more directions along the cable 105 while displacing the ground material 145. The boring attachment 120 may, in some examples, advance along the cable 105 through the action of displacing the ground material 145. For example, vibration, rotation, or the moling action of the boring attachment 120 may cause the boring attachment 120 to advance in one or more directions along the cable 105. In some embodiments, the boring attachment 120 may be advanced by mechanically feeding the hose 125 or retracting the hose 125.

In various embodiments, the boring attachment 120 may have a sleeve-like structure that may be fit over the outer sheath 110 of the cable 105. In other embodiments, the boring attachment 120 may have other structural configurations. For example, the structure of the boring attachment 120 may include, without limitation, a full or partial sleeve that is fit around the outer sheath 110, a collar, which may be opened and closed, that is secured around the outer sheath 110, or a probe-like device adjacent to the outer sheath 110 and attached to a guide, among other configurations. Moreover, in some embodiments, the boring attachment 120 may further include, without limitation, one or more of a pneumatic tool (e.g., piston vibrator), drill (e.g., toothed, twist, spade, unibit, step, hole, etc.), mole, impact tool, or other tooling suitable for displacing the ground material 145.

In further embodiments, the cable 105 or the boring attachment 120 may include a guide to accommodate movement longitudinally along the cable 105. In some embodiments, the guide may be separate from the cable 105 or boring attachment 120. In addition to moving longitudinally, the boring attachment 120 may further be configured to rotate around the outer sheath 110 circumferentially. Accordingly, the guide may include, without limitation, rails, tracks, bearings, loops, and sleeves. In some embodiments, the outer sheath 110 of the cable 105 may, itself, act as the guide for the boring attachment 120 to follow.

In various embodiments, once the ground material 145 has been displaced, a new cable may be installed. The new cable may include, without limitation, one or more new transmission lines, cables, or conduits (e.g., inner duct). Thus, in some embodiments, the boring attachment 120 may be configured to couple to the new cable, and move the new cable into position through the displaced ground material 145. In some embodiments, this may occur concurrently with the displacement of the ground material 145 by the boring attachment, while in other embodiments, the new cable may be placed by the boring attachment 120 after the ground material 145 has already been displaced. In yet further embodiments, once the ground material 145 has been displaced, the cable 105 may be removed from the ground altogether.

In various embodiments, the boring attachment 120 may be configured to place the new cable in a desired position. Placing the new cable in a desired position may include, without limitation, pulling, pushing, laying, or feeding the new cable into the desired position. For example, the boring attachment 120 may be configured to be coupled to the outer sheath 110 and to position one or more new cables on either side of the cable, coextending adjacently with the cable 105. It is to be understood that in other embodiments, the one or more new cables may be placed in different positions, such as, without limitation, above or below the cable 105. In yet further embodiments, the new cable may instead be an inner duct configured to encase the cable 105. Accordingly, in some embodiments, the boring attachment 120 may be configured to pull the inner ducting over the buried cable 105 such that the buried cable 205 is enclosed within inner ducting.

In some embodiments, the boring attachment 120 may include a connector to allow one or more new cables both to attach to, and detach from, the boring attachment 120. For example, after the new cable has been placed in the desired positioned, the boring attachment 120 may be configured to detach from one or more new cables. In some embodiments, the boring attachment 120 may include a connector configured to allow the hose 125 and/or one or more new cables to be removably attached to the boring attachment 120. In various embodiments, the connector of the boring attachment 120 may include, without limitation, clamps (e.g., cable clamps, hose clamps, etc.), fittings (e.g., barb fittings, etc.), fasteners (e.g., cable fasteners, wire ties, etc.), hooks, and other suitable mechanisms.

In various embodiments, the compressor 130 may be configured to actuate the boring attachment 120 via the hose 125. Thus, the boring attachment 120 may be air, gas, fluid, or electrically driven. The compressor 130 may include, without limitation, air or gas compressors, fluid pumps, or a combination of compressors and pumps. Accordingly, in various embodiments, the compressor 130 may be configured to compress and/or pump air, nitrogen, carbon dioxide, argon, steam, water (in liquid form), or a combination different types of fluids. In an alternative set of embodiments, the compressor 130 may be an electrical power supply.

In yet further embodiments, the system 100 may include a tracking device configured to track the location of the cable 105, boring attachment 120, new cables, or a combination of the cable 105, boring attachment 120, and new cables. In some embodiments, the boring attachment 120 may include the tracking device, while in other embodiments, the tracking device may be separate from the boring attachment. In some embodiments, the boring attachment 120 may be steerable, based at least in part, on the location of the cable 105, as determined by the tracking device. The tracking device may include various sensors, without limitation, ground penetrating radar, ultrasound, sonar, and other suitable devices for determining the location of a buried cable 105.

FIGS. 2-4 illustrate various views according to different configurations and modes of operations for the system 100. The various modes of operation of the system 100 are described with respect to the FIGS. 2-4.

Figure 2A:
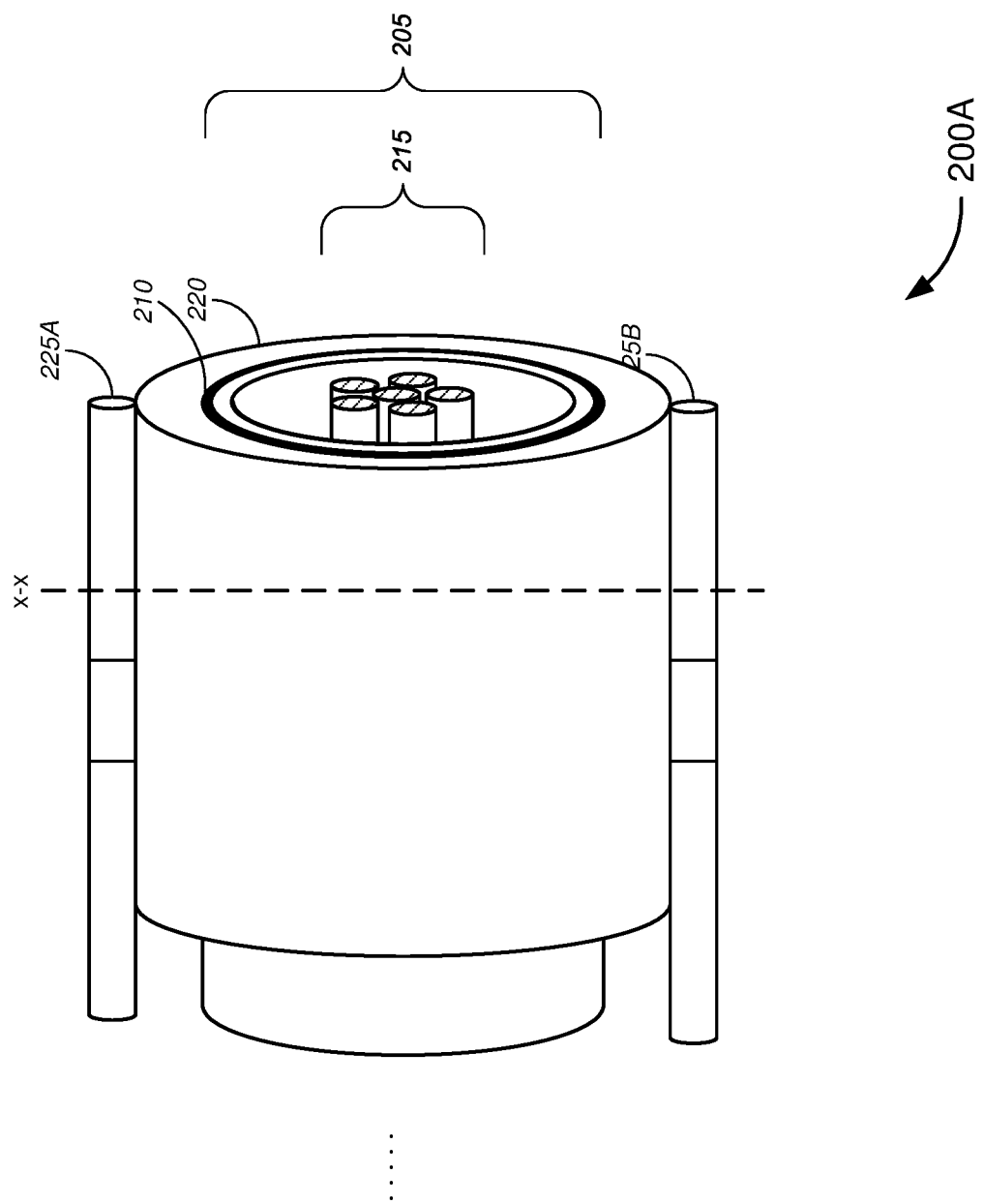
FIG. 2A is a side view of a buried cable and boring device, in accordance with various embodiments.

FIG. 2A is a side view 200A of a buried cable and boring attachment 220, according to various embodiments. The side view 200A includes cable 205, outer sheath 210, core 215, boring attachment 220, and new cables 225A, 225B. The side view 200A schematically depicts the structure of cable 205 and positioning of the boring attachment 220 after new cables 225A, 225B have been placed in position. As previously described, the cable 205 may include outer sheath 210 and core 215. The boring attachment 220 may be configured to be coupled to the outer sheath 210, and advance along a longitudinal axis of the cable 205. In the embodiments depicted, the new cables 225A, 225B may be positioned on either side of the cable 205. It is to be understood that in other embodiments, the new cables 225A, 225B may be placed in different positions, such as, without limitation, above or below the cable 205.

In the embodiments depicted, a tracking device (e.g., sensor) is incorporated into the boring attachment 220. Thus, the boring attachment 220 may be configured to determine a location of the cable 205. In some embodiments, the tracking device may also enable the boring attachment 220 to track travel distance along the cable 205, and a location of the boring attachment 220 relative to the cable 205. It is to be understood that side view 200A is a schematic illustration that has been simplified for ease of description and should not be taken as limiting.

Figure 2B:
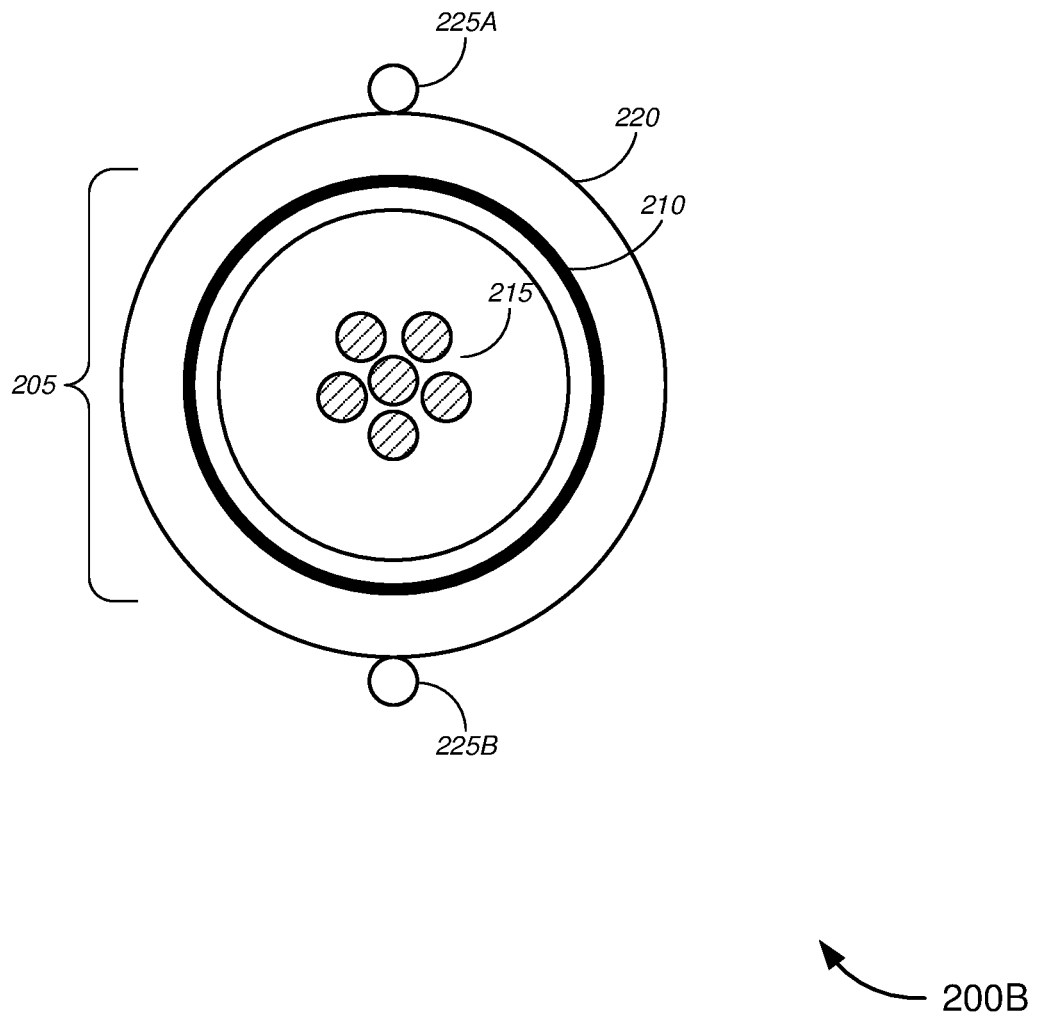
FIG. 2B is a transverse cross-sectional view of a buried cable and boring device, in accordance with various embodiments.

FIG. 2B is a transverse cross-sectional view 200B of a buried cable 205 and boring attachment 220, taken at line x-x of the side view 200A. The transverse cross-sectional view 200B illustrates the arrangement of the boring attachment 220, cable 205, and new cables 225A, 225B. In the transverse cross-sectional view 200B, it is apparent that the structure of the boring attachment 220 fully surrounds the outer sheath 210, thus acting as a sleeve around the cable 205. The boring attachment 220 may displace ground material from around the cable 205, allowing the new cables 225A, 225B to be installed.

Accordingly, a channel 230 of the desired size may be created by controlling the factors described above. The size of the channel 230 may refer to one or more of a cross sectional area of the channel 230, a total volume of the channel 230, a longitudinal length of the channel 230, or a diameter of the channel 230.

Figure 3A:
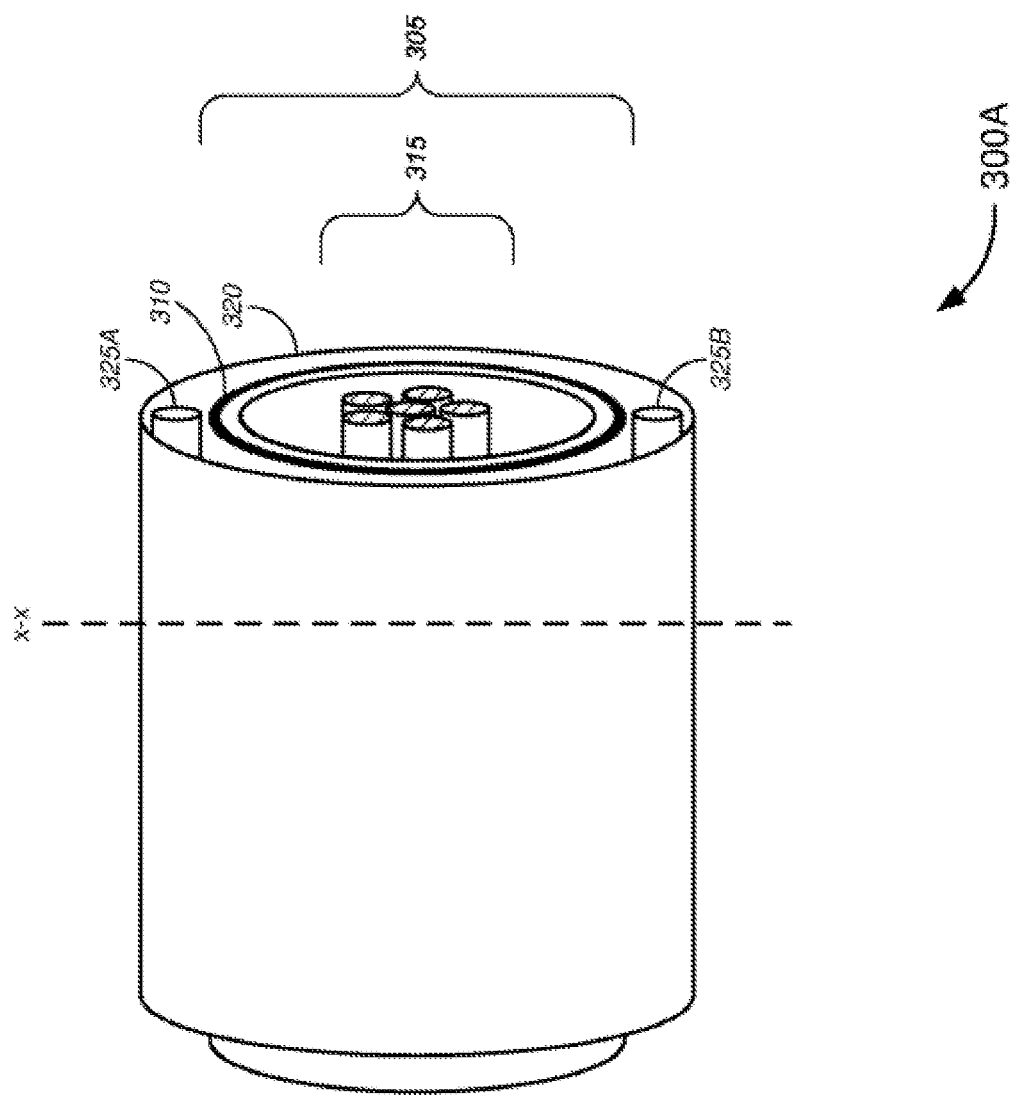
FIG. 3A is a side view of an alternative configuration for a buried cable and boring device, in accordance with various embodiments.

FIG. 3A is a side view of an alternative configuration for a buried cable 305 and boring attachment 320, in accordance with various embodiments. The side view 300A includes cable 305, outer sheath 310, core 315, boring attachment 320, and new cables 325A, 325B. The side view 300A schematically depicts the structure of cable 305 and positioning of the boring attachment 320 after new cables 325A, 325B have been placed in position.

As previously described, the cable 305 may include outer sheath 310 and core 315. The boring attachment 320 may be configured to be coupled to the outer sheath 310, and advance along a longitudinal axis of the cable 305. In contrast with FIGS. 2A & 2B, however, in the embodiments depicted, an above ground tracking device 330 (shown in FIG. 3B) is utilized. It is to be understood that side view 200A is a schematic illustration that has been simplified for ease of description and should not be taken as limiting.

Figure 3B:
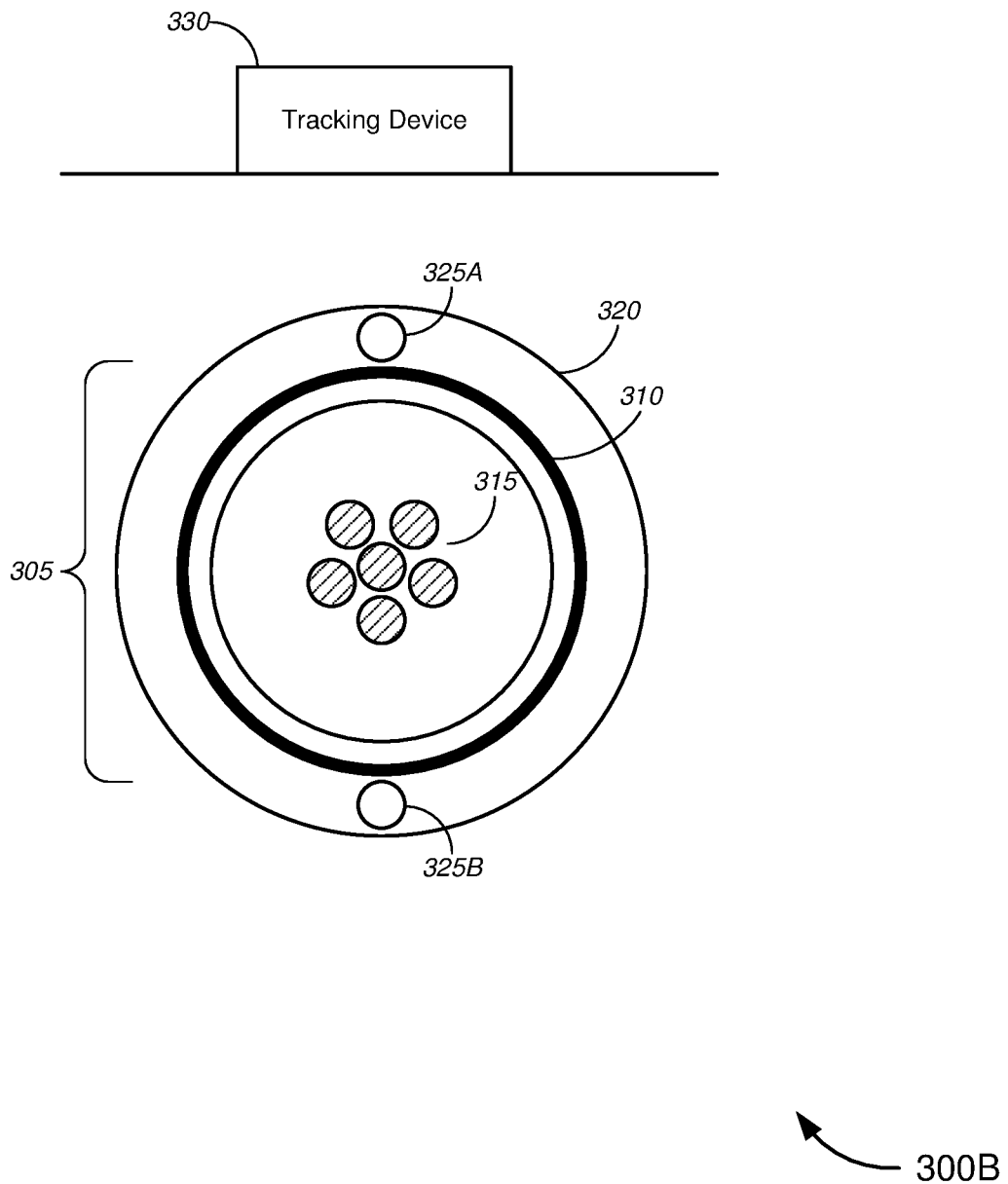
FIG. 3B is a transverse cross-sectional view of an alternative configuration for a buried cable and boring device, in accordance with various embodiments.

FIG. 3B is a transverse cross-sectional view 300B of an alternative configuration for a buried cable 305 and boring attachment 320. The transverse cross-sectional view 300B illustrates the arrangement of the boring attachment 320, cable 305, new cables 325A, 325B, and the above ground tracking device 330.

In the transverse cross-sectional view 300B, it is apparent that the structure of the boring attachment 320 fully surrounds the outer sheath 310, thus acting as a sleeve around the cable 305. The boring attachment 320 may displace ground material from around the cable 305, allowing the new cables 325A, 325B to be installed.

In various embodiments, the above ground tracking device 330 may be configured to determine a location of the cable 305 and/or the boring attachment 320. The tracking device 330 may be configured to track a distance traveled by the boring attachment 320 along the cable 305, and determine a location of the boring attachment 320 relative to the cable 305.

Figure 4A:
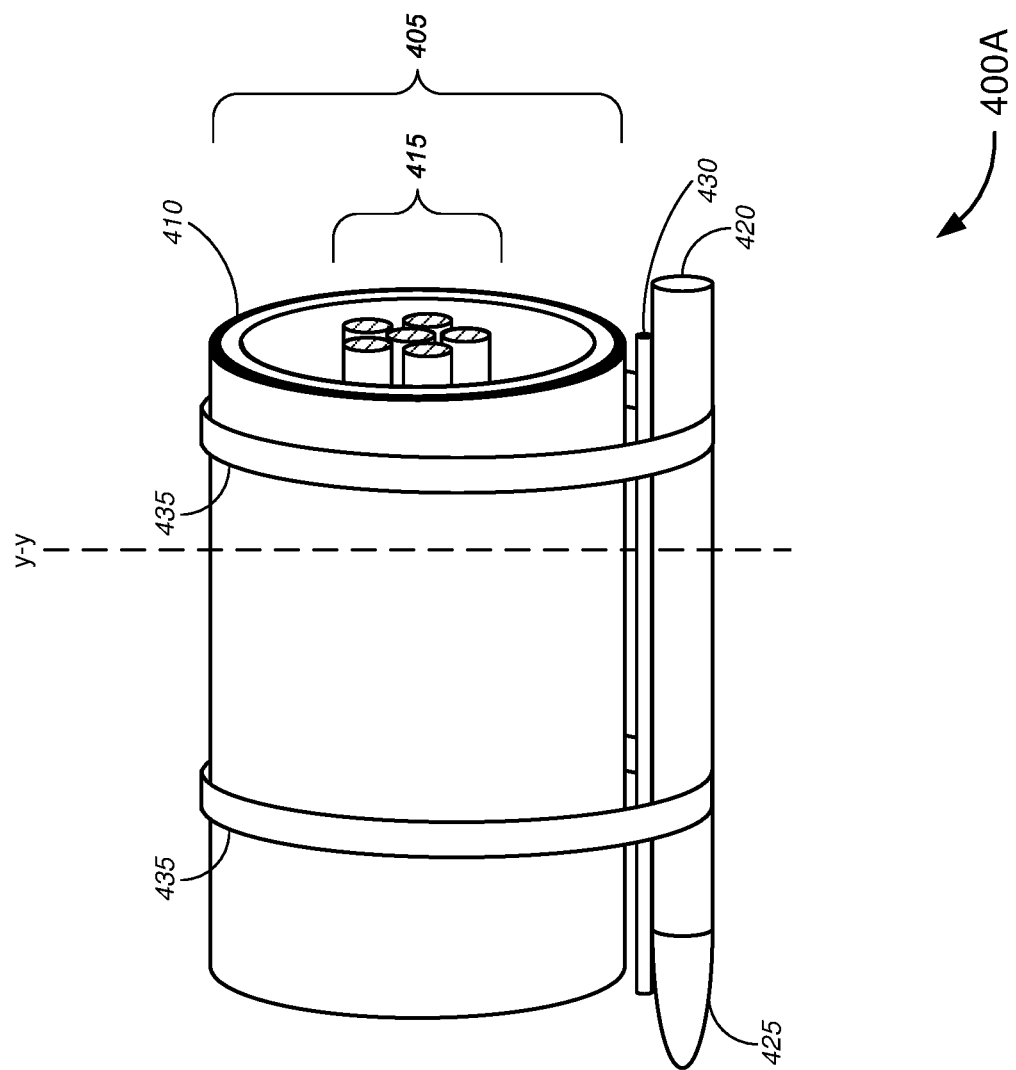
FIG. 4A is a side view of another alternative configuration for a buried cable and boring device, in accordance with various embodiments.

FIG. 4A is a side view 400A of another alternative configuration for a buried cable 405 and boring attachment 420, in accordance with various embodiments. The side view 400A includes cable 405, outer sheath 410, core 415, hose 420, boring attachment 425, new cable 430, and guides 435. The side view 400A schematically depicts the structure of cable 405 and positioning of the boring attachment 425 after new cable 430 has been placed in position.

As previously described, the cable 405 may include outer sheath 410 and core 415. The boring attachment 425 may be configured to be coupled to the outer sheath 410, and advance along a longitudinal axis of the cable 405. In contrast with the previous embodiments, however, the boring attachment 425 is attached to the outer sheath 410 via a guide 435. It is to be understood that side view 400A is a schematic illustration that has been simplified for ease of description and should not be taken as limiting.

In various embodiments, the boring attachment 425 may be configured to advance longitudinally along the cable 405 by utilizing the guide 435. As previously described, the guide may be one or more loops configured to secure the boring attachment 425 and hose 420 to the outer sheath of the cable 405, and to direct the boring attachment 425 in the desired direction. In other embodiments, the guide 435 may include, without limitation, rails, tracks, bearings, loops, and sleeves.

Furthermore, in some embodiments, the boring attachment 425 may include, without limitation, one or more of a pneumatic tool (e.g., piston vibrator), drill (e.g., toothed, twist, spade, unibit, step, hole, etc.), mole, impact tool, or other tooling suitable for displacing ground material underneath the cable 405. The hose 420 may be configured to operatively couple the boring attachment 425 to a compressor, which may in turn actuate the boring attachment 425.

In further embodiments, the boring attachment 425 may be positioned below the cable 405. The new cable 430 may, thus, be moved into positioned by the boring attachment 425, underneath the cable 405. In other embodiments, the boring attachment 425 may be oriented differently relative to the cable 405, and depending on a desired installation location for new cable 430.

Figure 4B:
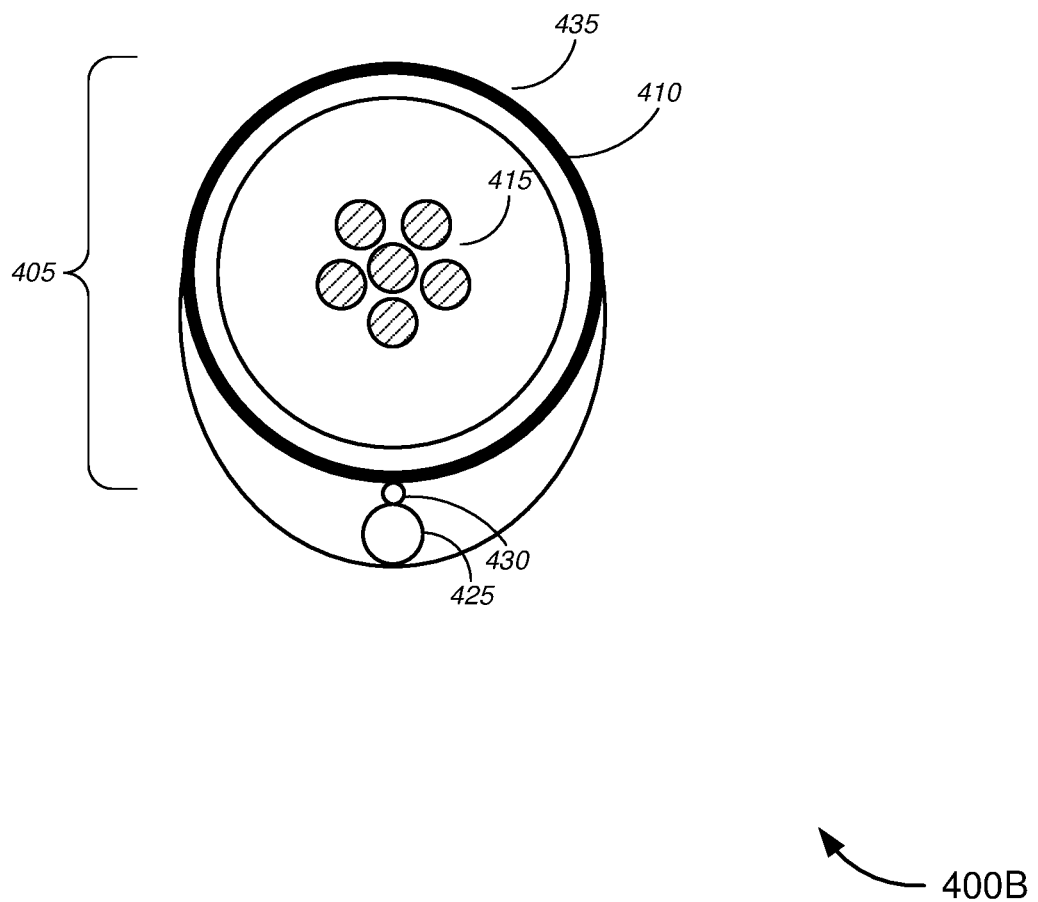
FIG. 4B is a transverse cross-sectional view of another alternative configuration for a buried cable and boring device, in accordance with various embodiments.

FIG. 4B is a transverse cross-sectional view illustrating the cable 405 and boring attachment 420, the section taken at line y-y of FIG. 4A. The transverse cross-sectional view 400B illustrates the arrangement of the boring attachment 425, cable 405, new cable 430, and guide 435.

In some embodiments, as shown in the transverse cross-sectional view 400B, the guide 435 may be one or more loops coupling the boring attachment 425 to the cable 405. The boring attachment 425, positioned below the cable 405, may be configured to displace ground material underneath the cable 405. The boring attachment 425 may further be configured to position new cable 430, pulling the new cable 430 as the boring attachment 425 advances along the cable 405. In some embodiments, the guide 435 may effectively act as a tracking device described in previous embodiments. In other embodiments, a tracking device may be utilized in combination with the guide 435.

In various embodiments, the new cable 430 may be moved into the desired positioned via boring attachment 425. Accordingly, the boring attachment 425 may further be configured to be coupled to or detached from the new cable 430. In some embodiments, the boring attachment 425 may include a connector configured to allow the hose 420 and/or new cable 430 to be removably attached to the boring attachment 425. In various embodiments, the connector of the boring attachment 425 may include, without limitation, clamps, such as clamps (e.g., cable clamps, hose clamps, etc.), fittings (e.g., barb fittings, etc.), fasteners (e.g., cable fasteners, wire ties, etc.), hooks, and other suitable mechanisms.

While certain features and aspects have been described with respect to exemplary embodiments, one skilled in the art will recognize that numerous modifications are possible. For example, the methods and processes described herein may be implemented using different combinations of hardware components. Further, while various methods and processes described herein may be described with respect to structural and/or functional components for ease of description, methods provided by various embodiments are not limited to any specific structural and/or functional architecture, but instead can be implemented utilizing any suitable configuration or arrangement of parts. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a compressor;
   a sensor configured to detect a location of a buried cable;
   a boring attachment operatively coupled to the compressor and further coupled to an outer sheath of the buried cable, the boring attachment configured to be actuated by the compressor, wherein in response to being actuated by the compressor, the boring attachment is configured to:
   advance in at least one direction along a longitudinal axis of the buried cable; and
   track, based on input from the sensor, at least one of a travel distance along the buried cable or a location of the boring attachment relative to the buried cable.

2. The system of claim 1, wherein the boring attachment is further configured to displace at least some ground material, in contact with the buried cable, in which the buried cable is buried.

3. The system of claim 2, wherein the boring attachment is steerable, based at least in part on the location of the buried cable.

4. The system of claim 2, wherein the boring attachment is configured to allow, via displacement of the at least some ground material, the buried cable to be removed.

5. The system of claim 1, wherein the boring attachment comprises the sensor, wherein the boring attachment is further configured to track the position of the buried cable as the boring attachment advances in the at least one direction.

6. The system of claim 1, wherein the boring attachment further comprises a guide configured to couple to the outer sheath of the buried cable, and configured direct the movement of the boring attachment.

7. The system of claim 1, wherein the boring attachment further comprises a sleeve configured to couple circumferentially around the buried cable, wherein the sleeve is configured to traverse the buried cable in the at least one direction.

8. The system of claim 1, wherein the boring attachment is further configured to couple to a new cable, wherein the boring attachment is further configured to place the new cable in a desired position coextensive with the buried cable.

9. The system of claim 1, wherein the boring attachment is further configured to couple to an inner duct, wherein the boring attachment is configured to pull the inner duct over the buried cable such that the buried cable is enclosed within the inner duct.

10. The system of claim 1, wherein the boring attachment is configured to vibrate responsive to being driven by the compressor.

11. The system of claim 1, wherein the boring attachment is configured to produce a vibrating action responsive to being driven by the compressor.

12. An apparatus comprising:
   a boring attachment, operatively coupled to a compressor, wherein the boring attachment is configured to be coupled to an outer sheath of a buried cable and be driven by the compressor, wherein the boring attachment is configured to be coupled to a sensor, and wherein the sensor is configured to detect a location of the buried cable, the boring attachment is configured to:
   advance in at least one direction along a longitudinal axis of the buried cable; and track, based on input from the sensor, at least one of a travel distance along the buried cable or a location of the boring attachment relative to the buried cable.

13. The apparatus of claim 12, wherein the boring attachment is configured to advance in the at least one direction coextensive to a longitudinal axis of the buried cable.

14. The apparatus of claim 12, wherein the boring attachment is further configured to displace at least some ground material, in contact with the buried cable, in which the buried cable is buried.

15. The apparatus of claim 12, wherein the boring attachment further comprises a guide configured to couple to the outer sheath of the buried cable and to direct the movement of the boring attachment.

16. The apparatus of claim 12, wherein the boring attachment further comprises a sleeve configured to couple circumferentially around the buried cable, wherein the sleeve is configured to traverse the buried cable in the at least one direction.

17. The apparatus of claim 12, wherein the boring attachment is further configured to couple to a new cable, wherein the boring attachment is further configured to place the new cable in a desired position coextensive with the buried cable.

18. The apparatus of claim 12, wherein the boring attachment is further configured to couple to an inner duct, wherein the boring attachment is configured to pull the inner duct over the buried cable such that the buried cable is enclosed within inner duct.

19. A method comprising:
attaching a boring attachment to an outer sheath of a buried cable;
coupling a sensor to the boring attachment;
detecting a location of the buried cable with the sensor;
advancing, with the boring attachment, in at least one direction coextensive with a longitudinal axis of the buried cable; and
tracking, based on input from the sensor, at least one of a travel distance along the buried or a location of the boring attachment relative to the buried cable.

20. The method of claim 19, further comprising:
pulling, via the boring attachment, a new cable into a desired position coextensive with an original position of the buried cable.

* * * * *